United States Patent
Cheng et al.

(10) Patent No.: US 6,746,075 B2
(45) Date of Patent: Jun. 8, 2004

(54) ADJUSTABLE SERVING TRAY

(75) Inventors: Huang-Yi Cheng, Chia-I Hsien (TW); Mao-Shen Chen, Tainan (TW); Tse-Chien Wu, Kaohsiung (TW)

(73) Assignee: Link Treasure Limited, Chia-I Hsien (TW)

( * ) Notice: Subject to any disclaimer, the term of this patent is extended or adjusted under 35 U.S.C. 154(b) by 0 days.

(21) Appl. No.: 10/318,252

(22) Filed: Dec. 13, 2002

(65) Prior Publication Data

US 2003/0111878 A1 Jun. 19, 2003

(30) Foreign Application Priority Data

Dec. 14, 2001 (TW) .......................................... 090222051

(51) Int. Cl.⁷ ................................................. B62B 9/12
(52) U.S. Cl. .................. 297/149; 297/153; 297/188.14
(58) Field of Search ................................. 297/149, 151, 297/153, 188.14, 243

(56) References Cited

U.S. PATENT DOCUMENTS

| | | | | |
|---|---|---|---|---|
| 2,118,509 A | * | 5/1938 | Heinritz | 297/151 |
| 2,342,043 A | * | 2/1944 | Feldman | 297/153 |
| 2,394,141 A | * | 2/1946 | Braden | 297/151 |
| 2,707,020 A | * | 4/1955 | Nobbe | 297/151 |
| 2,875,815 A | * | 3/1959 | Gill | 297/153 |
| 3,490,808 A | * | 1/1970 | Siegel | 297/153 |
| 4,858,947 A | * | 8/1989 | Yee et al. | |
| 4,946,180 A | * | 8/1990 | Baer | |
| D418,780 S | | 1/2000 | Everett et al. | |
| 6,241,273 B1 | | 6/2001 | Gehr | |
| 6,302,033 B1 | * | 10/2001 | Roudebush | |
| 6,416,124 B1 | * | 7/2002 | Chen et al. | |

* cited by examiner

Primary Examiner—Peter R. Brown
(74) Attorney, Agent, or Firm—Birch, Stewart, Kolasch & Birch, LLP

(57) ABSTRACT

An adjustable serving tray mainly includes an anchor apparatus located on armrests at two sides of a stroller. Each armrest has an inner side with a retaining flute formed thereon. The serving tray has coupling sections on two sides, each with an anchor trough and a latch lug. In normal usage conditions, the anchor trough engages with the anchor apparatus and the latch lug is latched in the retaining flute to anchor the serving tray. By releasing the anchor apparatus, the serving tray may be slid forwards to form a larger entrance space on the stroller to seat a child. Thus the child may be seated on the rear seat without removing the serving tray to improve convenience of use.

16 Claims, 7 Drawing Sheets

ADJUSTABLE SERVING TRAY

FIELD OF THE INVENTION

The invention relates to a stroller and particularly to an adjustable serving tray for a double-seat stroller.

BACKGROUND OF THE INVENTION

Strollers are mostly made in a single seat fashion. However, parents who have two small children generally choose a double-seated stroller when taking the children outdoors together. There are generally two types of double-seated strollers now available on the market. One type has two seats arranged abreast such as U.S. Pat. No. DES. 418,780. It has a greater width than the single seat stroller and thus has many constraints while moving—for example, it is not easy to pass a door—therefore it is not widely accepted. Another type has two seats arranged in a front and a rear manner such as the one disclosed in U.S. Pat. No. 6,241,273. Its width is the same as the single seat stroller, thus is more convenient to use and more popular. To support two seats in the front and rear manner, it has a top tube to connect the frame and also to serve as the armrest to confine the children. In addition, in order to increase the usefulness of the stroller, the double-seated stroller generally has a serving tray located on the front seat for holding food and drinks for the children. However, due to the limited length of the frame, the rear seat has a constraint space. When the serving tray is installed on the rear seat, it is difficult to seat the child. Hence the serving tray must be removed before seating the child, and installed after the child is seated. This is inconvenient.

SUMMARY OF THE INVENTION

In view of the aforesaid disadvantages, the primary object of the invention is to provide an adjustable serving tray that mainly includes an anchor apparatus on the armrests at two sides of the stroller. The inner side of the armrests has a retaining flute, and two sides of the serving tray each have a coupling section, which includes an anchor trough and a latch lug. When used in normal conditions, the anchor trough of the serving tray is latched on the anchor apparatus of the armrest and the latch lug is wedged in the flute on the inner side of the armrest to form an anchoring condition. When adjusting the serving tray, the anchor apparatus may be released, and the serving tray may be slid forwards to form a larger entrance space to seat the child. Thus the invention enables a child to be seated on the rear seat by adjusting the position of the serving tray without removing the serving tray. It is thus more convenient to use.

Another object of the invention is to couple the serving tray with the armrest on a corresponding pivotal point located on the armrest. When seating a child on the second seat in the rear, the serving tray may be swung upward to form a larger entrance space to make seating the child easier.

The foregoing, as well as additional objects, features and advantages of the invention will be more readily apparent from the following detailed description, which proceeds with reference to the accompanying which are given by way of illustration only, and thus are not limitative of the present invention.

DESCRIPTION OF THE PREFERRED EMBODIMENTS

Figure 1:
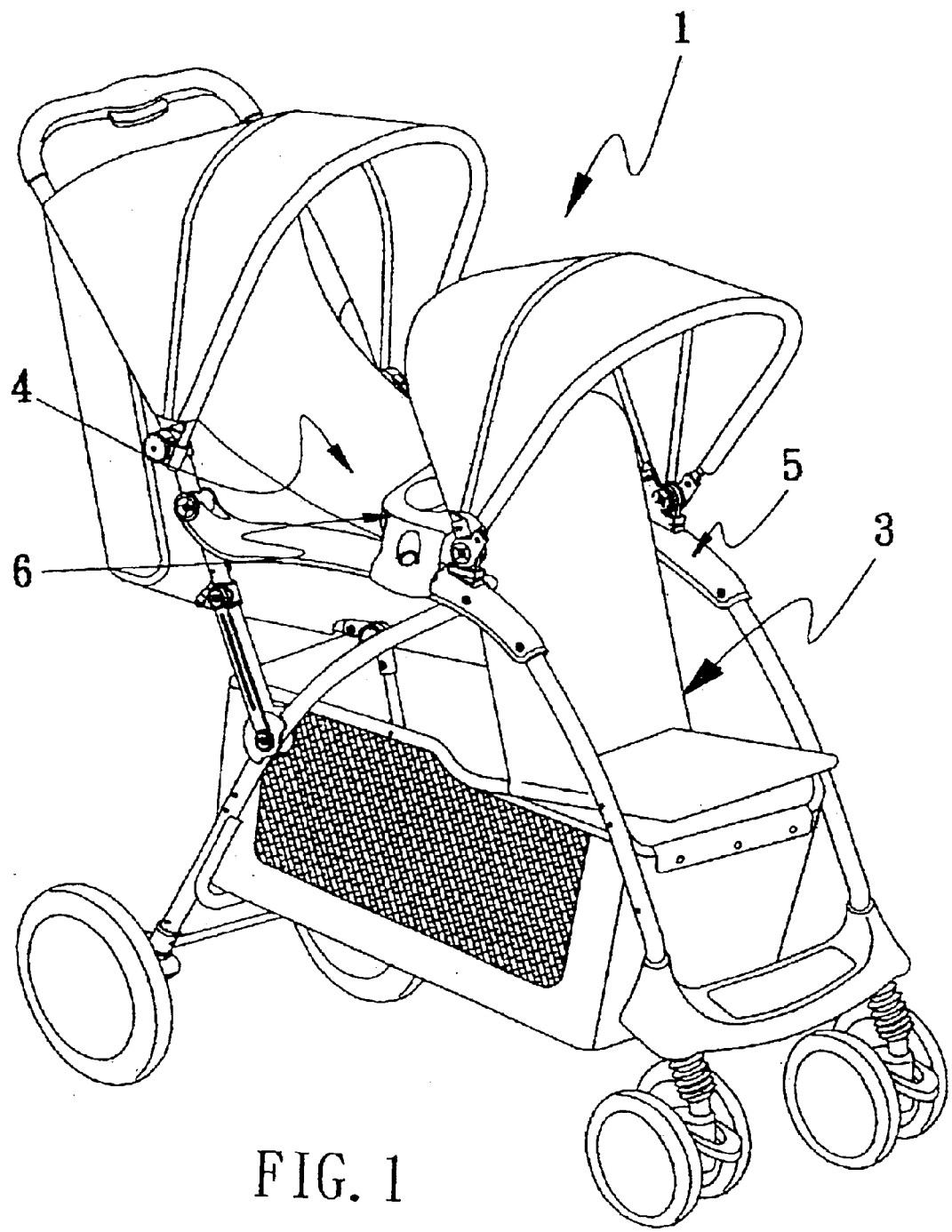
FIG. 1 is a perspective view of the invention.
Figure 2:
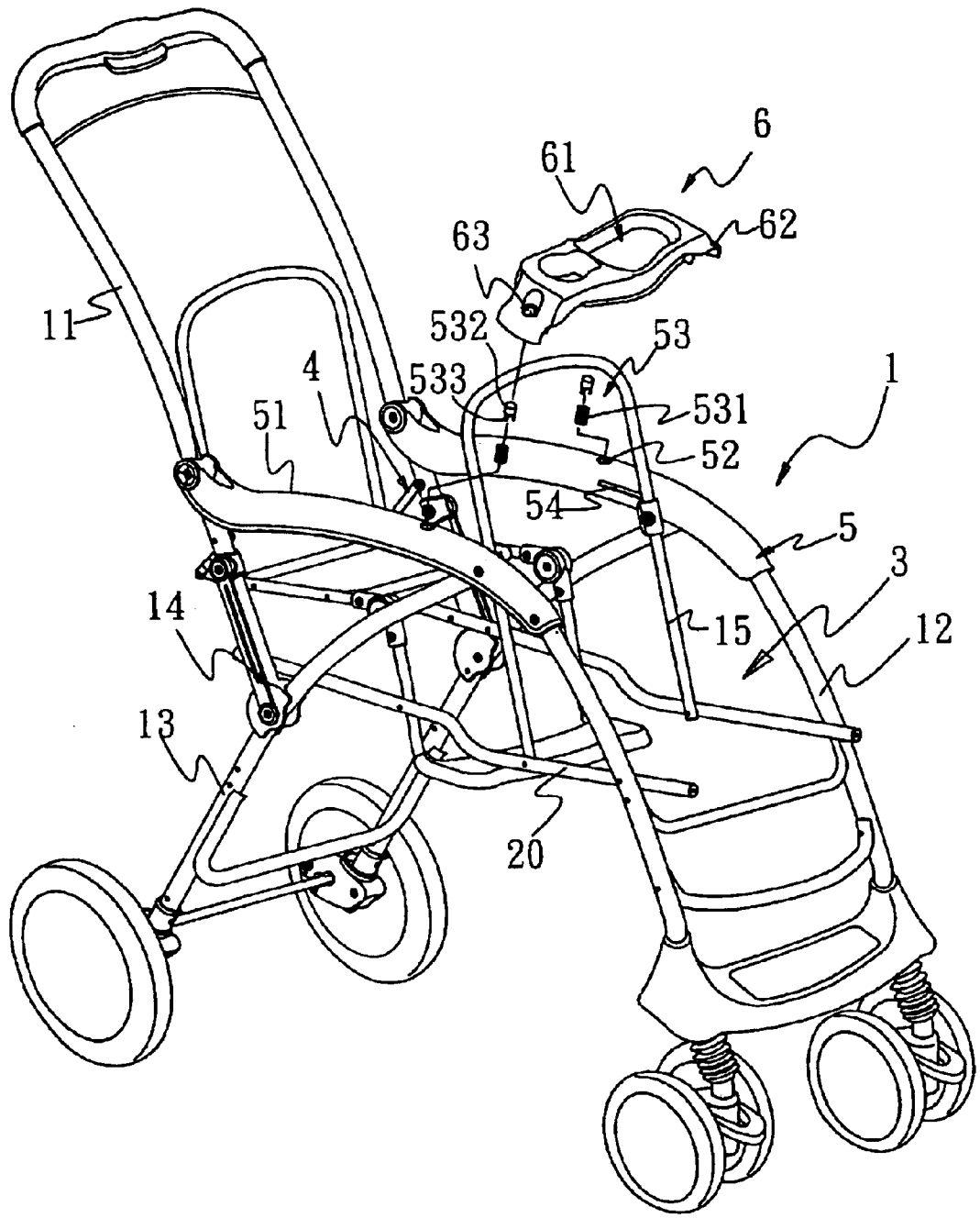
FIG. 2 is a perspective view of the invention with the serving tray detached.
Figure 6:
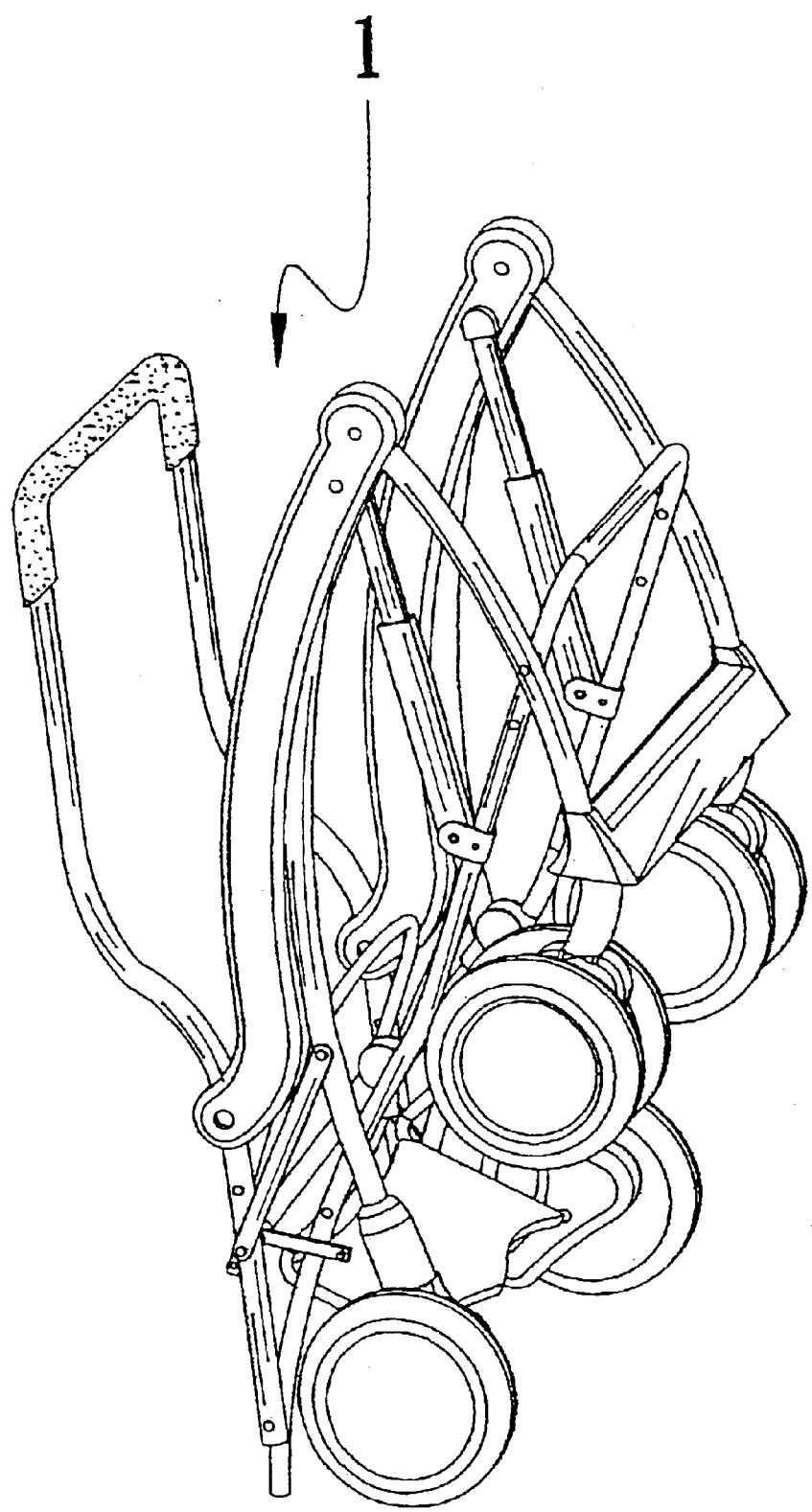
FIG. 6 is a perspective view of the invention with the frame in a folded condition.

Referring to FIGS. 1 and 2, the adjustable serving tray according to the invention is mounted onto a frame 1 of a double-seated stroller that has a first seat section 3 and a second seat section 4. The frame 1 includes at least a handle tube 11, a pair of armrests 5, a front wheel tube 12, a rear wheel tube 13, a release mechanism 14 and a seat linkage bar 20 that are pivotally engaged with one another. There is a backrest tube 15 to segment the first seat section 3 in the front and the second seat section 4 in the rear. When the release mechanism 14 is released and latched, the frame 1 may be extended to a usage condition and a folding condition (as shown in FIG. 6).

The armrests 5 each have a top surface 51 at the second seat section with a housing hole 52 formed thereon. The housing hole 52 holds an anchor apparatus 53. The armrests 5 further have an inner side with a through retaining flute 54 formed thereon.

The anchor apparatus 53 includes a compression spring 531 and a pushbutton 532. The compression spring 531 is housed in the housing hole 52 of the armrest 5 and the pushbutton 532 is movable in the housing hole 52. After installation, the compression spring 531 pushes the pushbutton 532 to extend outside the top surface 51 of the armrest 5. The pushbutton 532 has a hook 533 to prevent the pushbutton 532 from being pushed out.

Figure 3:
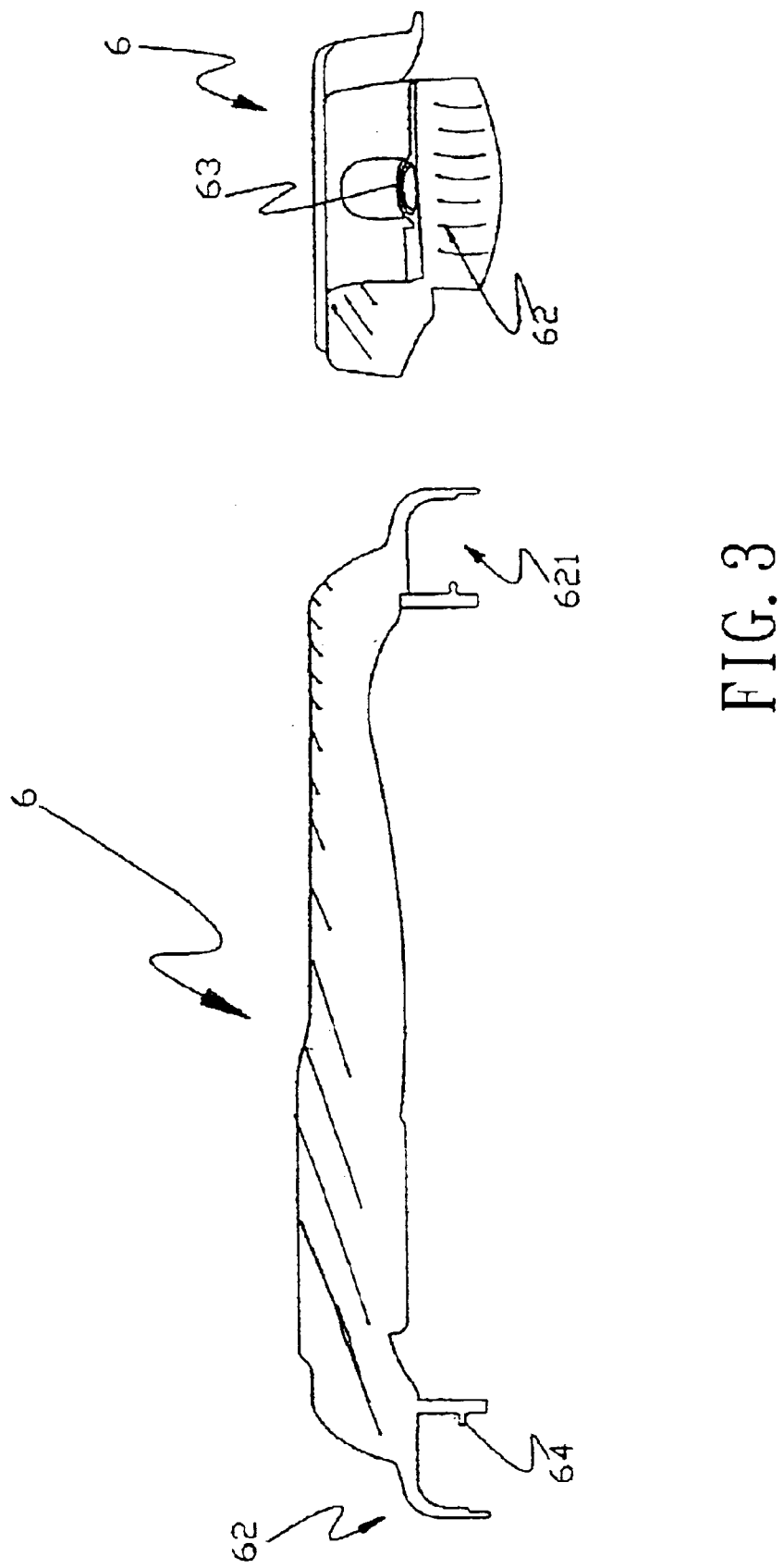
FIG. 3 is a front view and a side view of the serving tray of the invention.
Figure 4:
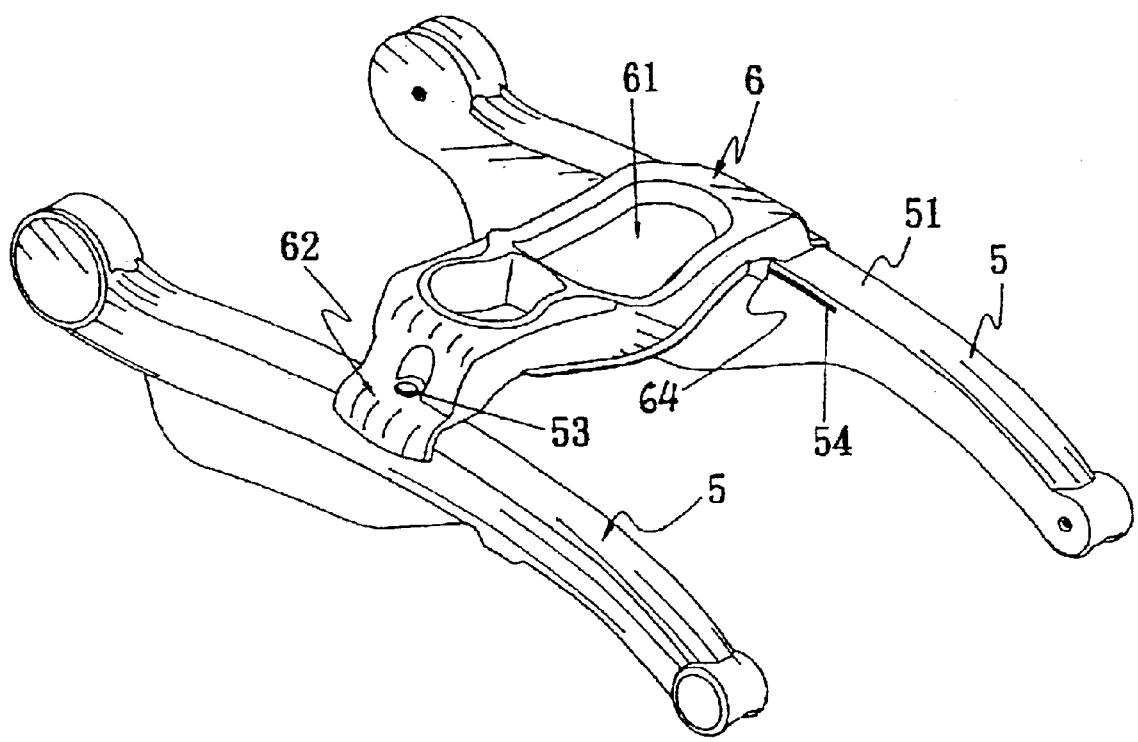
FIG. 4 is a perspective view of the serving tray coupled with the armrests according to the invention.

There is a serving tray 6 (also referring to FIGS. 3 and 4) that has a body with a holding area 61 formed thereon and two sides each with a coupling section 62 with a notch 621 for coupling with the armrest 5. The coupling section 62 has a through anchor trough 63 and a latch lug 64 located on an inner side thereof.

Figure 5:
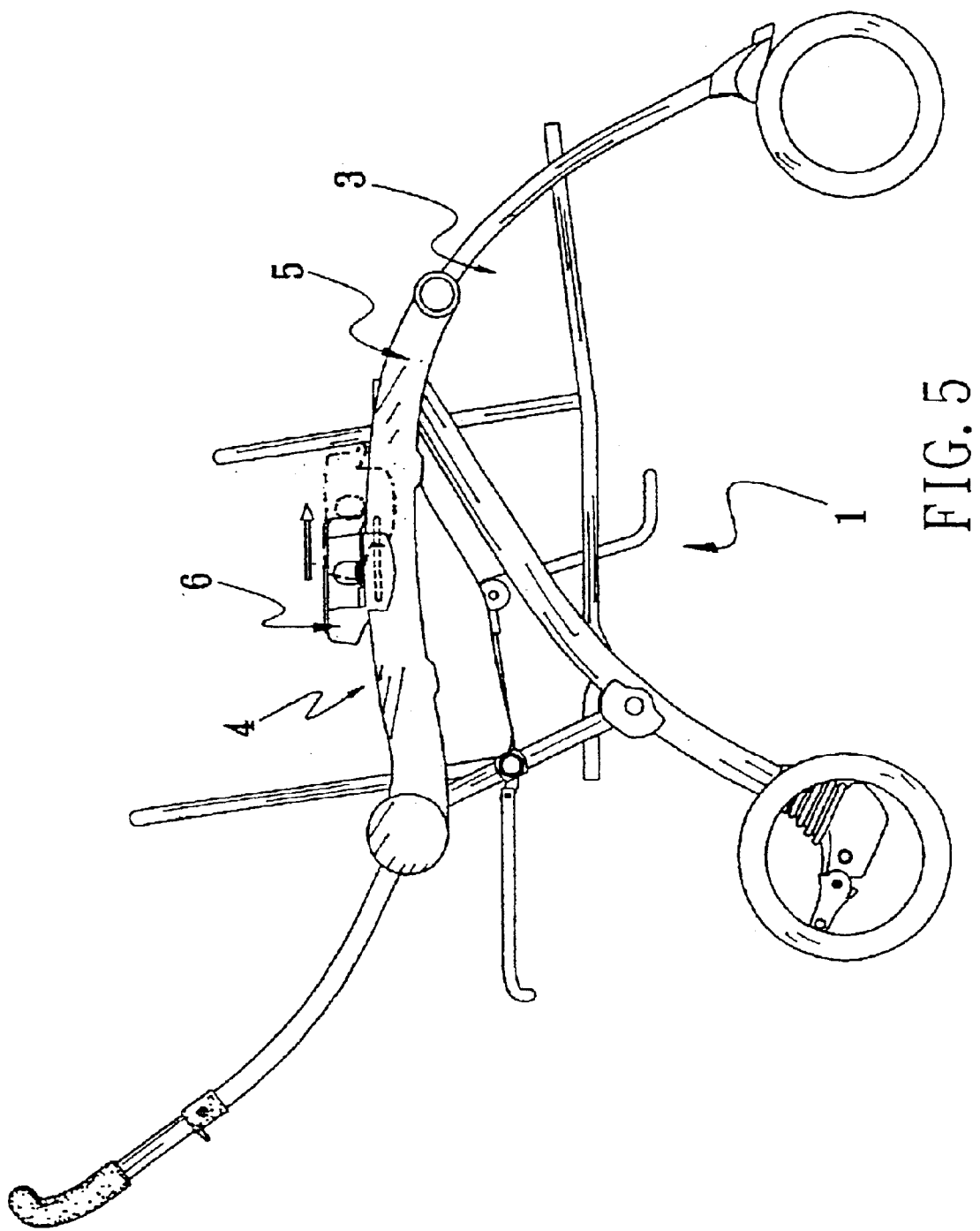
FIG. 5 is a schematic view of moving the serving tray on the armrest according to the invention.

Referring to FIG. 5, when the serving tray 6 is mounted onto the armrests 5 of the second seat section, the coupling section 62 couples with the armrest 5, and the latch lug 64 is wedged in the retaining flute 54 on the inner side of the armrest 5. In addition, the anchor trough 63 of the coupling section 62 is coupled with the anchor apparatus 53 of the armrest 5 to enable the serving tray 6 be held and anchored on the armrest 5 securely. When adjusting the serving tray 6, depress the pushbutton 532 to enable the pushbutton 532 to escape from the anchor trough 63. The serving tray may then be moved forwards. Meanwhile, the latch lug 64 is moving in the retaining flute 54 without being separated. Thus the serving tray 6 may be moved in a parallel manner without separating from the armrests 5. By means of such an adjustment, a desired space may be formed in the second seat section 3 to seat a child.

Figure 7:
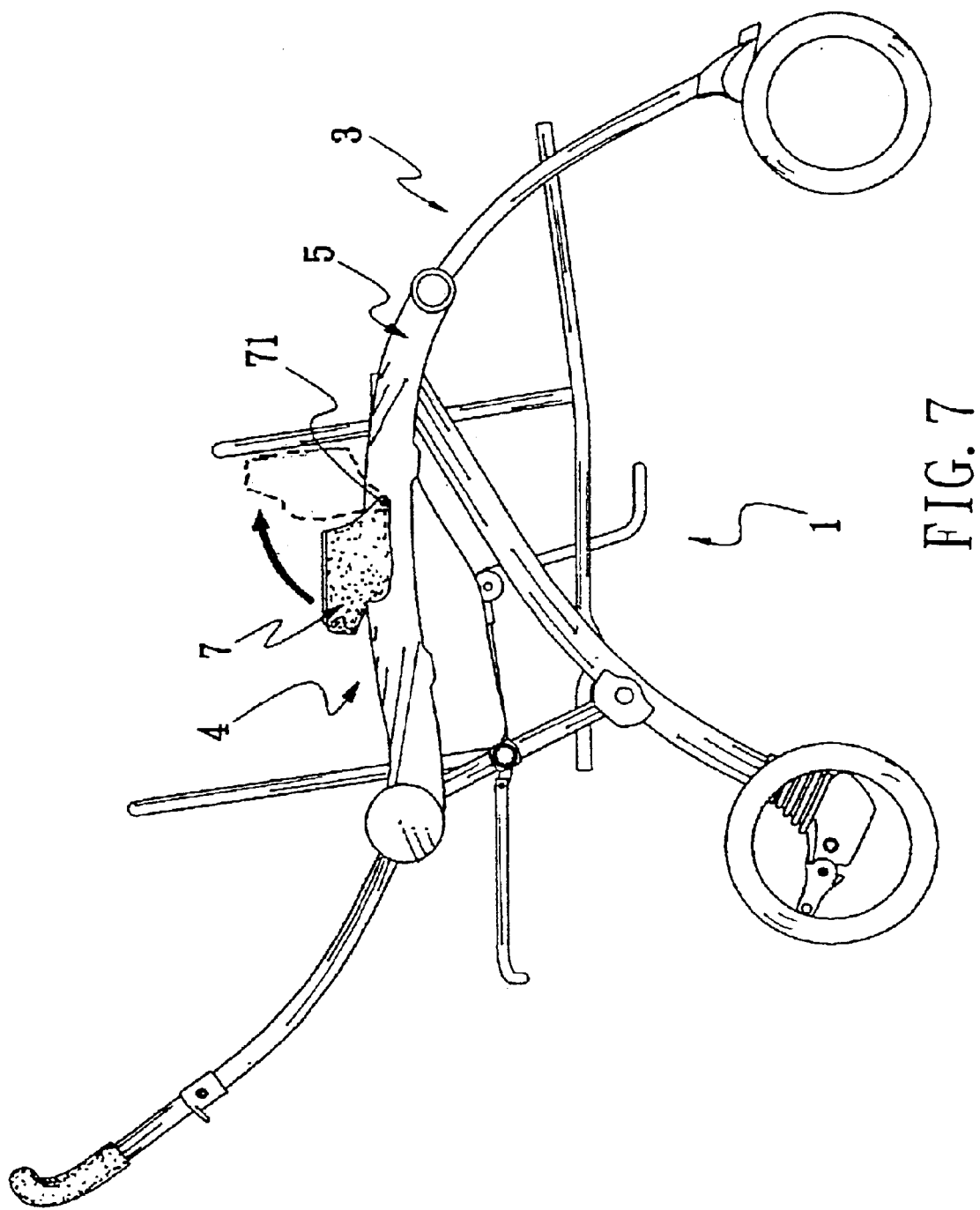
FIG. 7 is a schematic view of another embodiment of the invention in a moving condition.

Refer to FIG. 7 for another embodiment of the invention. The serving tray 7 is pivotally engaged with the armrest 5 through a pivotal point 71 without the anchor apparatus 53 and the latch lug 64. When in use, the serving tray 7 is directly coupled with the armrest 5. When seating a child, turn the serving tray 7 about the pivotal point 71 to enlarge the entrance space for seating the child on the second seat section 4. After the child is seated, the serving tray 7 may be turned back to the original position.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An adjustable serving tray movably mounted on a pair of armrests located on two sides of a stroller frame comprising:
   a serving tray having a body and two coupling sections located on two sides thereof, each coupling section having an anchor trough, the serving tray further having a latch lug located on an inner side of at least one of the coupling sections; and
   a pair of armrests pivotally engaged with the stroller frame having an anchor apparatus;
   wherein the serving tray is slidably coupled with the armrests and anchored at a first position by engaging the anchor apparatus with the anchor trough and is released from the first position by releasing the anchor apparatus, the latch lug on the at least one coupling section of the serving tray being engagable with one of the armrests to slidably hold the serving tray on the armrest.

2. The adjustable serving tray of claim 1, wherein each of the coupling sections of the serving tray have a latch lug on an inner side thereof.

3. The adjustable serving tray of claim 2, wherein both of the armrests have a retaining flute formed thereon to allow the latch lugs to move therein.

4. The adjustable serving tray of claim 1, wherein the stroller frame includes a handle tube, a front wheel tube, a rear wheel tube, a backrest tube, a release mechanism and a seat linkage bar that are pivotally engaged with one another, the stroller frame being extendable and foldable by releasing and latching the release mechanism.

5. The adjustable serving tray of claim 1, wherein the at least one armrest has a retaining flute formed thereon to allow the latch lug to move therein.

6. The adjustable serving tray of claim 1, wherein at least one of the armrests has a top surface with a housing hole formed therein for holding the anchor apparatus.

7. The adjustable serving tray of claim 6, wherein the anchor apparatus includes a compression spring and a pushbutton, the compression spring being held in the housing hole and the pushbutton being movable in the housing hole, the pushbutton being extended outside the top surface of the armrest by the compression spring in normal condition.

8. The adjustable serving tray of claim 7, wherein the pushbutton includes a hook to latch on the armrest to prevent the pushbutton from escaping from the housing hole.

9. An adjustable serving tray detachably mounted on a frame of a double-seat stroller that has a first seat and a second seat, comprising:
   a serving tray having a body and two coupling sections each having an anchor trough, the serving tray further having a latch lug located on an inner side of at least one of the coupling sections; and
   a pair of armrests pivotally engaged with the frame having an anchor apparatus located at the second seat;
   wherein the serving tray is slidably coupled with the armrests and anchored at a first position by engaging the anchor apparatus with the anchor trough and is released from the first position by releasing the anchor apparatus, the latch lug on the at least one coupling section of the serving tray being engagable with one of the armrests to slidably hold the serving tray on the armrest.

10. The adjustable serving tray of claim 9, wherein each of the coupling sections of the serving tray have a latch lug on an inner side thereof.

11. The adjustable serving tray of claim 10, wherein both of the armrests have a retaining flute formed thereon to allow the latch lugs to move therein.

12. The adjustable serving tray of claim 9, wherein the stroller frame includes a handle tube, a front wheel tube, a rear wheel tube, a backrest tube, a release mechanism and a seat linkage bar that are pivotally engaged with one another, the stroller frame being extendable and foldable by releasing and latching the release mechanism.

13. The adjustable serving tray of claim 9, wherein the at least one armrest has a retaining flute formed thereon to allow the latch lug to move therein.

14. The adjustable serving tray of claim 9, wherein at least one of the armrests has a top surface with a housing hole formed therein for holding the anchor apparatus.

15. The adjustable serving tray of claim 14, wherein the anchor apparatus includes a compression spring and a pushbutton, the compression spring being held in the housing hole and the pushbutton being movable in the housing hole, the pushbutton being extended outside the top surface of the armrest by the compression spring in normal condition.

16. The adjustable serving tray of claim 15, wherein the pushbutton includes a hook to latch on the armrest to prevent the pushbutton from escaping from the housing hole.

* * * * *